(12) United States Patent
Wang et al.

(10) Patent No.: US 12,314,889 B2
(45) Date of Patent: May 27, 2025

(54) DELIVERY EVENT DETECTION SYSTEMS AND METHODS

(71) Applicant: Comcast Cable Communications, LLC, Philadelphia, PA (US)

(72) Inventors: Hongcheng Wang, Arlington, VA (US); Luke Deluccia, Philadelphia, PA (US); Sara Cuesta Gonzalez, Philadelphia, PA (US); Zhe Wu, Great Falls, VA (US); Toufiq Parag, Ashburn, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 32 days.

(21) Appl. No.: 17/958,893

(22) Filed: Oct. 3, 2022

(65) Prior Publication Data

US 2024/0112125 A1 Apr. 4, 2024

(51) Int. Cl.
| | |
|---|---|
| *G06Q 10/0833* | (2023.01) |
| *G06Q 10/083* | (2023.01) |
| *G06T 7/215* | (2017.01) |
| *G06V 20/40* | (2022.01) |
| *G06V 20/52* | (2022.01) |

(52) U.S. Cl.
CPC ....... *G06Q 10/0833* (2013.01); *G06Q 10/083* (2013.01); *G06T 7/215* (2017.01); *G06V 20/41* (2022.01); *G06V 20/52* (2022.01); *G06T 2207/20081* (2013.01)

(58) Field of Classification Search
CPC .. G06Q 10/0833; G06Q 10/083; G06T 7/215; G06T 2207/20081; G06V 20/41; G06V 20/52

See application file for complete search history.

(56) References Cited

U.S. PATENT DOCUMENTS

| | | | |
|---|---|---|---|
| 11,295,139 B2 | 4/2022 | Khadloya et al. | |
| 12,006,197 B1* | 6/2024 | Hamlik | B66F 9/148 |
| 2015/0310381 A1* | 10/2015 | Lyman | G06Q 10/083 |
| | | | 705/330 |
| 2018/0075681 A1 | 3/2018 | Scalisi et al. | |
| 2018/0374115 A1* | 12/2018 | Aggarwal | G06Q 30/0204 |
| 2019/0303684 A1 | 10/2019 | Khadloya et al. | |
| 2020/0082690 A1* | 3/2020 | Bunker | H04N 7/186 |
| 2020/0193362 A1* | 6/2020 | Nishikawa | G06Q 10/08 |
| 2020/0271461 A1* | 8/2020 | Yamashita | G06Q 10/06315 |
| 2020/0302385 A1* | 9/2020 | Rehn | G06Q 10/0833 |
| 2021/0347386 A1* | 11/2021 | Katayama | G07C 9/00563 |
| 2022/0083782 A1* | 3/2022 | Qian | G06F 18/22 |
| 2022/0122785 A1 | 4/2022 | Fadell et al. | |
| 2022/0398750 A1* | 12/2022 | Kerzner | G06V 10/62 |
| 2023/0032321 A1* | 2/2023 | Grillo | H04N 23/81 |
| 2023/0110877 A1* | 4/2023 | Shayne | H04N 7/186 |
| | | | 348/155 |
| 2023/0316762 A1* | 10/2023 | Khadloya | G07C 9/00896 |
| | | | 382/103 |

* cited by examiner

*Primary Examiner* — Bobbak Safaipour
(74) *Attorney, Agent, or Firm* — Banner & Witcoff, Ltd.

(57) ABSTRACT

Systems, apparatuses, and methods are described for detection of an item being delivered at a premises. Based on a movement pattern shown in a video captured by a camera associated with a premises, a delivery event may be determined. A notification of the delivery event may be sent to a user device associated with the premises.

32 Claims, 7 Drawing Sheets

DELIVERY EVENT DETECTION SYSTEMS AND METHODS

BACKGROUND

Many delivery services deliver items (e.g., packages, food, and mail) to a household. A user may want to receive notifications if a delivery event occurs so that the user may retrieve the items being delivered.

SUMMARY

The following summary presents a simplified summary of certain features. The summary is not an extensive overview and is not intended to identify key or critical elements.

Systems, apparatuses, and methods are described for providing notifications that a delivery event (e.g., delivery of one or more items such as packages, boxes, food and/or other goods, mail, etc.) has occurred at a user's premises. A camera that is installed at or near the premises may capture a video associated with a delivery event. The video may be processed so that the delivery event may be determined (e.g., recognized). A notification may be sent to a user device if it is determined that the delivery event occurs. The determination of the delivery event may be made by determining (e.g., recognizing) the movement pattern of a delivery person or other contextual information that is typically associated with a delivery event. Movement patterns that indicate typical behaviors of a delivery person (e.g., approaching the front door of the premises and then leaving the front door within a certain amount of time) may be indicative of a delivery event, even if the actual delivered item(s) are not detected in the video (e.g., the item(s) are too small, ambient light is too dark, the item(s) are placed at a location outside of the field of view of the camera, etc.). This may help with providing accurate delivery notifications to the user.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
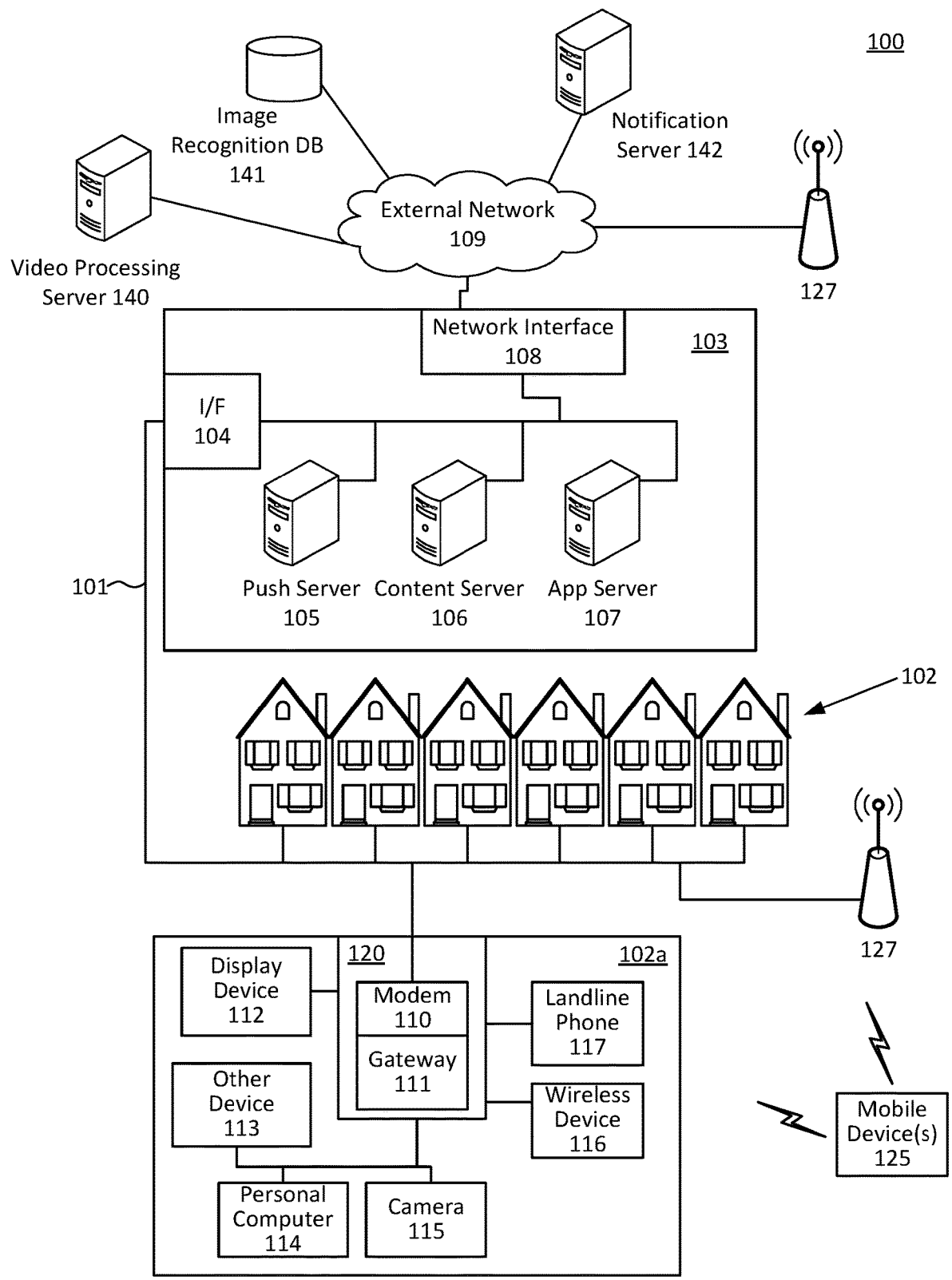
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. The local office 103 may comprise additional servers, additional push, content, and/or application servers, and/or other types of servers. Also or alternatively, one or more servers may be part of the external network 109 and may be configured to communicate (e.g., via the local office 103) with computing devices located in or otherwise associated with one or more premises 102.

For example, a video processing server 140 and a notification server 142 may communicate with the local office 103 (and/or one or more other local offices), one or more premises 102, one or more access points 127, one or more mobile devices 125, and/or one or more other computing devices via the external network 109. The video processing server 140 may perform video processing and/or other operations, as described below. The notification server 142 may send notifications of delivery events to user devices, as described below. Also or alternatively, the video processing server 140 and/or the notification server 142 may be located in the local office 103, in a premises 102, and/or elsewhere in a network. The video processing server 140 may communicate with an image recognition database 141. The image recognition database 141 may store libraries and/or other data that may be used in connection with video processing performed by the video processing server 140. For example, and as described below, separate libraries and/or other data may be maintained for use in performing image recognition for video input received from different sources (e.g., from devices associated with different users, premises, accounts, etc.). Although shown as a separate element, the image recognition database 141 may be part of the video processing server 140. Also or alternatively, the push server 105, the content server 106, the application server 107, the video processing server 140, the notification server 142 and/or other server(s) may be combined. The servers 105, 106, 107, 140, 142, or other servers, and/or the image recognition database 141, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, cameras 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
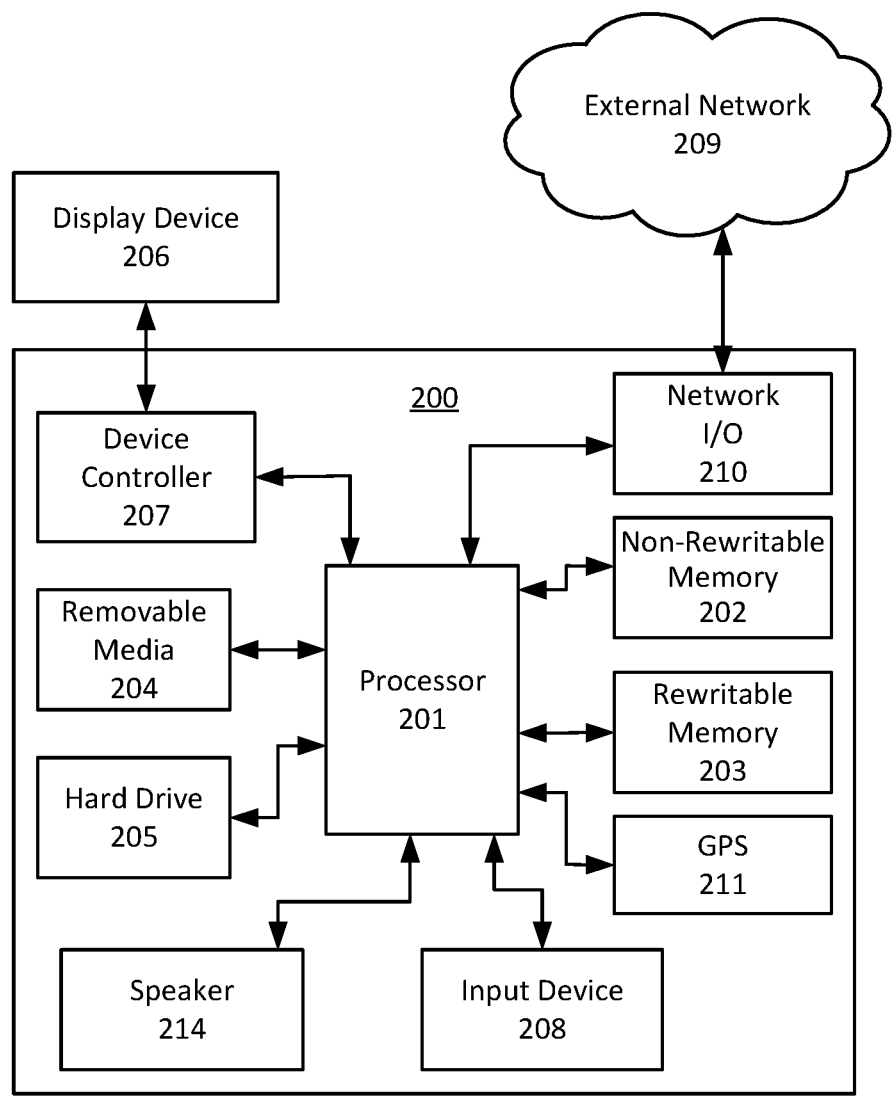
FIG. 2 shows hardware elements of a computing device.
Figure 3:
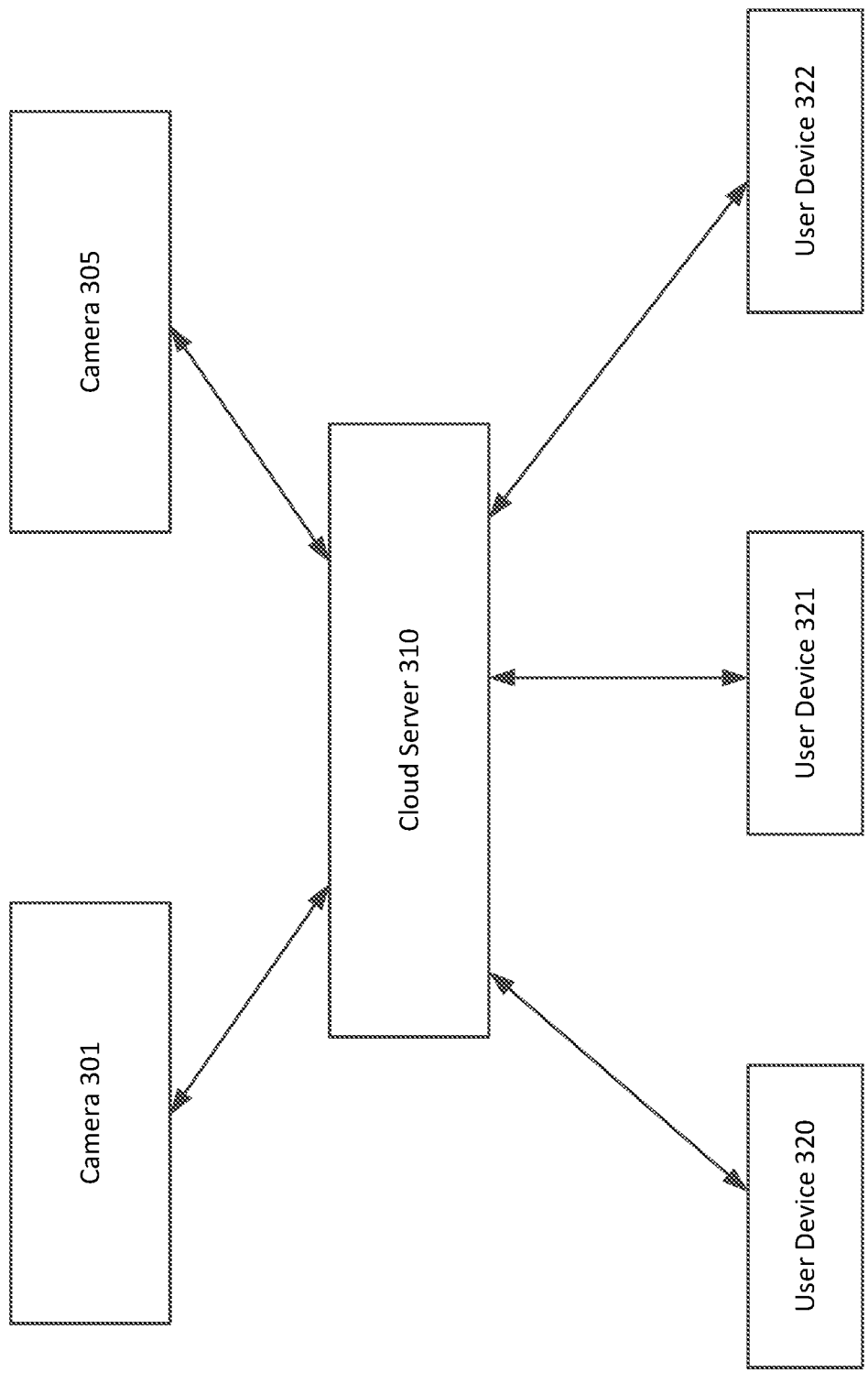
FIG. 3 shows an example of computing devices communicating via a network.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109), any of the computing devices shown in FIG. 3 (e.g., cameras 301, 305, cloud server 310, user devices 320, 321, and 322), and/or any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on the execution of programming instructions read from ROM or RAM, with other operations hardwired into gates or other logic. Further, an IC may be configured to output image data to a display buffer.

FIG. 3 shows an example of computing devices configured to communicate via one or more networks. A plurality of cameras (e.g., camera 301 and camera 305) may each be associated with a premises 102. For example, each of the plurality of the cameras may be installed on or near a premises 102 (e.g., each of the plurality of the cameras may be camera 115 as shown in FIG. 1, and/or may be installed on or near premises 102a as shown in FIG. 1). The field of view of a camera may cover a geographical area near the associated premises, including an outdoor space in front of a door of the associated premises. Each of the plurality of cameras may be configured to monitor (e.g., capture video associated with) the field of view of that camera, so that the user may learn what happens near the premises. In particular, as may be discussed in greater detail below, each of the plurality of cameras may be configured to detect that a delivery event (e.g., delivery of one or more items such as packages, boxes, food and/or other goods, mail, etc.) occurred at a premises by capturing a video of a delivery person who delivers the item(s). The video may be processed to determine (e.g., recognize) the delivery event. The video processing may be performed locally by the camera, or performed at least partially by one or more additional devices that communicate with the camera.

As shown in FIG. 3, a cloud server 310 may be configured to receive data from each of the plurality of cameras and perform at least a portion of the video processing function to determine whether a delivery event occurs. The communication between the cloud server 310 and each of the plurality of cameras may be via a network (e.g., external network 109 as shown in FIG. 1). The cloud server 310 may implement some or all functions of the video processing server 140 and/or the image recognition database 141, as shown in FIG. 1. Although only two cameras are shown in FIG. 3, any number of cameras may communicate with the cloud server 310. The video processing function (e.g., delivery event recognition) may be performed entirely at a camera and/or may be allocated between a camera and the cloud server 310. As another example, the camera 301 may detect a motion in the field of view, record a video that is associated with the detected motion, and send the video to the cloud server 310 for further processing, in order to determine whether a delivery event occurs. In another example, the camera 301 may determine a motion is associated with an object of interest (e.g., a delivery person), select one or more frames that are representative of the movement of the object of interest, and send the selected frames to the cloud server 310 for further processing. In yet another example, the camera may send the original video to the cloud server 310 and the cloud server 310 may be responsible to perform all steps for video processing as discussed below.

The cloud server 310 may also be configured to communicate with a plurality of user devices (e.g., user devices 320, 321, and 322). The communication may be made via a network (e.g., external network 109 as shown in FIG. 1). The cloud server 310 may implement some or all functions of the video processing server 140 and/or the image recognition database 141, as shown in FIG. 1. Although only three user devices are shown in FIG. 3, any number of user devices may communicate with the cloud server 310. Each of the plurality of user devices may be configured to receive notifications from the cloud server 310 if an item is determined to be delivered at a premises associated with the user device. For example, each of the plurality of user devices may comprise a gateway 111, a personal computer 114, a wireless device 116, or a mobile device 125 as shown in FIG. 1, and/or any other computing device. A user device may be associated with a premises by logging in to a user account that is associated with the premises. A notification may be a push notification, an email, a text message, or any other form of notification.

Figure 4A:
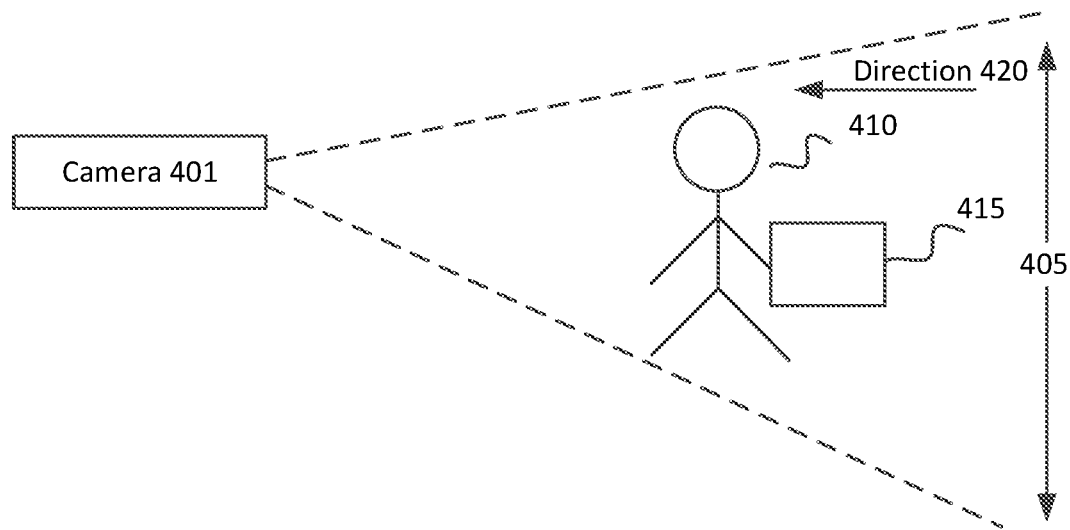
FIGS. 4A-4C show an example of a delivery event.
Figure 4B:
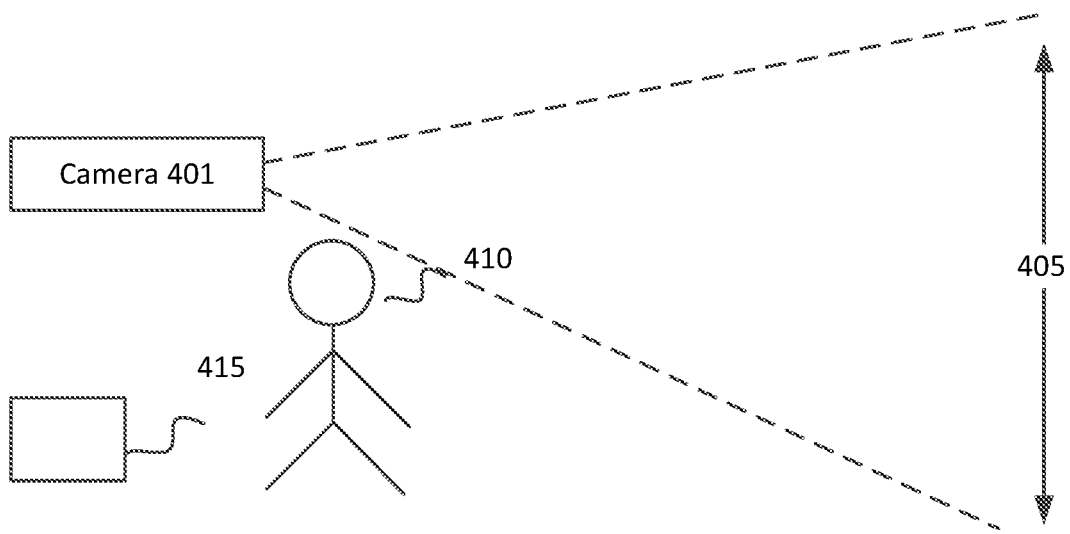
Figure 4C:
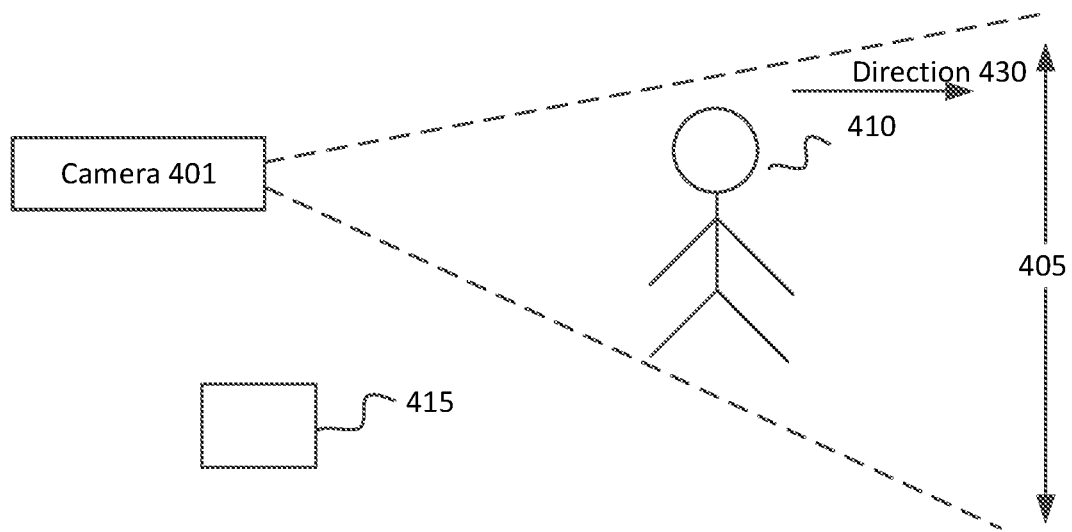

FIGS. 4A, 4B, and 4C show an example of a delivery event that may be detected and/or determined (e.g., recognized). Camera 401 may be one of the plurality of cameras (e.g., one of the cameras 301 or 305) as shown in FIG. 3, and/or camera 115 as shown in FIG. 1. For convenience, FIGS. 4A, 4B, and 4C are described by way of an example in which some the steps are performed by the camera 401. Also or alternatively, one, some, or all steps of the example method of FIGS. 4A, 4B, and 4C, or portions thereof, may be performed by one or more other computing devices (e.g., the cloud server 310, video processing server 140, image recognition database 141, notification server 142, or any of the computing devices shown in FIGS. 1-3). FIGS. 4A, 4B, and 4C show movement over time of a delivery person 410.

Referring to FIG. 4A, the camera 401 may be installed on or near a premises (not shown in FIG. 4A). The field of view 405 of camera 401 may be an area within the dotted lines. The field of view 405 may cover an outdoor space in front of a door of the premises. FIG. 4A shows that, at time t1, a person 410 carrying an item 415 walks into the field of view 405 of the camera 401. The person 410 may move in a direction 420 towards the door of the premises (e.g., from a delivery truck associated with the person 410). The motion of the delivery person 410 may be detected. The camera 401 may start to process (e.g., record or analyze) a video. For example, a video may be recorded and/or stored separately from previous videos before the motion of the delivery person 410 is detected, so that the video may be retrieved later to determine a delivery event. Additionally or alternatively to detecting a motion, an appearance of the person 410 may be detected, and the camera 401 may start to process (e.g., record or analyze) the video based on the appearance of the person 410. A timestamp corresponding to the motion was detected and/or the appearance of the person 410 may be recorded.

Referring to FIG. 4B, at time t2 after time t1, the delivery person 410 may stop at the door and place the item 415 right next to the door of the premises. On some occasions, the item 415 may not be captured in the video, or may be captured in the video but not recognized. For example, all or a portion of the item 415 may be placed outside the field of view 405 of the camera 401 (e.g., because the item 415 is placed right under the camera 401 and the field of view 405 does not cover that area). On some occasions, the delivery person 410 may also move out of the field of view 405 while placing the item 415 next to the door. The camera 401 may keep recording the video even if the delivery person 410 and/or the item 415 temporarily move out of the field of view 405 at a time period around time t2, so that the camera 401 may be able to capture the subsequent movement of the delivery person 410 if the delivery person 410 moves back into the field of view 405 at a later time point. For example, the camera 401 may keep recording the video for 2 minutes after the delivery person 410 moves out of the field of view 405. If the delivery person 410 moves back into the field of view 405 within 2 minutes, the camera 401 may continue recording the video. If the delivery person 410 does not move back into the field of view 405 within 2 minutes, the camera 401 may stop recording the video. Alternatively, the camera 401 may stop recording the video once after the delivery person 410 moves out of the field of view 405, but resume recording the video after the delivery person 410 moves back into the field of view 405. During the video processing stages, as described in greater detail below, the camera 401 may link the previously recorded video associated with time t1 and the resumed video together based on the same delivery person 410 being captured in the video, so that more information may be provided to determine the delivery event.

Referring to FIG. 4C, at time t3 after time t2, the delivery person 410 may move in direction 430 away from the door of the premises (e.g., to the delivery truck), after the delivery person 410 places the item 415 in front of the door. The camera 401 may process (e.g., record or analyze) the video (either as a separate video or as a continuation of the video recorded in FIG. 4A) while the delivery person 410 moves back to the delivery truck. FIGS. 4A, 4B, and 4C are merely examples, and images of one or more other types of events may also or alternatively be detected and/or recognized to determine a delivery event. Events such as those shown in FIGS. 4A, 4B, and 4C may be detected and/or recognized independently (e.g., in isolation) to determine a delivery event. For example, the camera 401 may determine a delivery event has occurred based on detecting and/or recognizing (e.g., as described herein) only a portion of the delivery event (e.g., as depicted in less than all of FIGS. 4A, 4B, and 4C).

The recorded video may be analyzed. As discussed above in FIG. 3, the video analyzing may be implemented by the camera 401 and/or by one or more additional computing devices (e.g., the cloud server 310). A movement pattern may be detected based on the video recorded, and a determination as to whether a delivery event occurs may be made accordingly.

For example, the camera 401 (and/or one or more additional computing devices) may determine that the person 410 moves, during a first time period (e.g., from a time when a motion of the person 410 was first detected, to a time when the person 410 stops near the door), in a first direction (e.g., direction 420 as shown in FIG. 4A). The camera 401 (and/or one or more additional computing devices) may also determine that the person 410 moves, during a second time period (e.g., from a time when the person 410 moves back toward where the person came from, to a time when the person 410 disappears from the field of view 405), in a second direction (e.g., direction 430 as shown in FIG. 4C). A high likelihood of a delivery event may be determined if the first direction 420 and the second direction 430 are substantially opposite directions. That may indicate a delivery person brings an item from a delivery vehicle (e.g., a car), leaves the item at the door of the premises, and then goes back to the delivery vehicle. This may, for example, distinguish from a neighbor who simply passes by. Additionally or alternatively, a high likelihood of a delivery event may also be determined if the time period when the delivery person stops near the door (and/or disappears from view, as shown in FIG. 4B) is of a predetermined duration (e.g., within 2 minutes). This may indicate a delivery person spends the time placing an item by the door instead of doing more complicated tasks. For example, this may distinguish from a friend who visits the premises or a salesman who solicits a sale at the premises, where the time period may be significantly longer than 2 minutes.

Additionally or alternatively, the camera 401 (and/or one or more additional computing devices) may determine that the delivery person moves, in the first direction 420, together with the item 415, and that the delivery person moves, in the second direction 430, without the item 415. The determination may be made by comparing video (or video frames) that were captured while the delivery person 410 moves in the first direction 420 with video (or video frames) that were captured while the delivery person 410 moves in the second direction 430. Sometimes, recognizing, from the video, the presence of the item 415 (and/or recognizing the item 415) may be difficult. For example, the item 415 may be too small and the majority of portions of the item 415 may be shielded by the delivery person 410's hand or body. In another example, the ambient light may be too dark to detect a clear boundary of the item 415. In yet another example, the item 415 may be of an irregular shape that is not recognizable. However, in those or similar situations, the camera 401 (and/or one or more additional computing devices) may detect the presence of the item 415 on the delivery person's way to the premises by comparing the videos (or video frames) before and after the delivery person 410 stops at the door. For example, the camera 401 (and/or one or more additional computing devices) may recognize, from a first video frame captured during a first time period, a first moving blob. A moving blob may comprise one or more objects or partial objects, captured by the camera, that move together. The camera 401 may recognize all or at least a portion of the moving blob, or the camera 401 might not recognize any portion of the moving blob. For example, the first moving blob may comprise both the delivery person 410 and the item 415. The camera 401 (and/or one or more additional computing devices) may recognize, from a second video frame captured during a second time period, a second moving blob that includes the delivery person 410 but not the item 415. The differences between the first moving blob and the second moving blob may be compared to determine whether a delivery event occurs.

Additionally or alternatively, the camera 401 (and/or one or more additional computing devices) may determine that a second movement pattern of the delivery person 410 around the time while the delivery person 410 stops at the door. For example, the camera 401 may determine that the delivery person 410 bends over, places the item 415 by the door, and/or stands up again. The second movement pattern may be used to improve the accuracy of determining a delivery event.

In addition to the movement pattern, contextual information may also be used and analyzed to further improve the accuracy of determining a delivery event. For example, if the delivery person 410 wears a uniform that has a logo, or the item 415 has a logo attached to it, such uniform or logo may indicate a delivery event occurs. In another example, if the delivery vehicle is a large truck that is typically used for delivery, it may indicate a delivery event occurs. If the truck appears in the field of view 405, the camera 401 may capture the arrival and/or departure of the truck. If the truck does not appear in the field of view 405, the sound of a large truck may be recorded by a microphone associated with the camera 401. The sound of a large truck may be indicative of a delivery event. Other sounds may also be utilized, either alone or in combination with the recorded video. For example, the sound of knocking on a door may be indicative of a delivery event, especially if the video shows that the person who knocks on the door leaves soon after the knocking, without waiting for the host to open the door. It is appreciated that the above-discussed types of contextual information are merely examples, and other types of contextual information are possible. FIGS. 4A to 4C are merely examples. It is appreciated that other variations may be possible.

Figure 5:
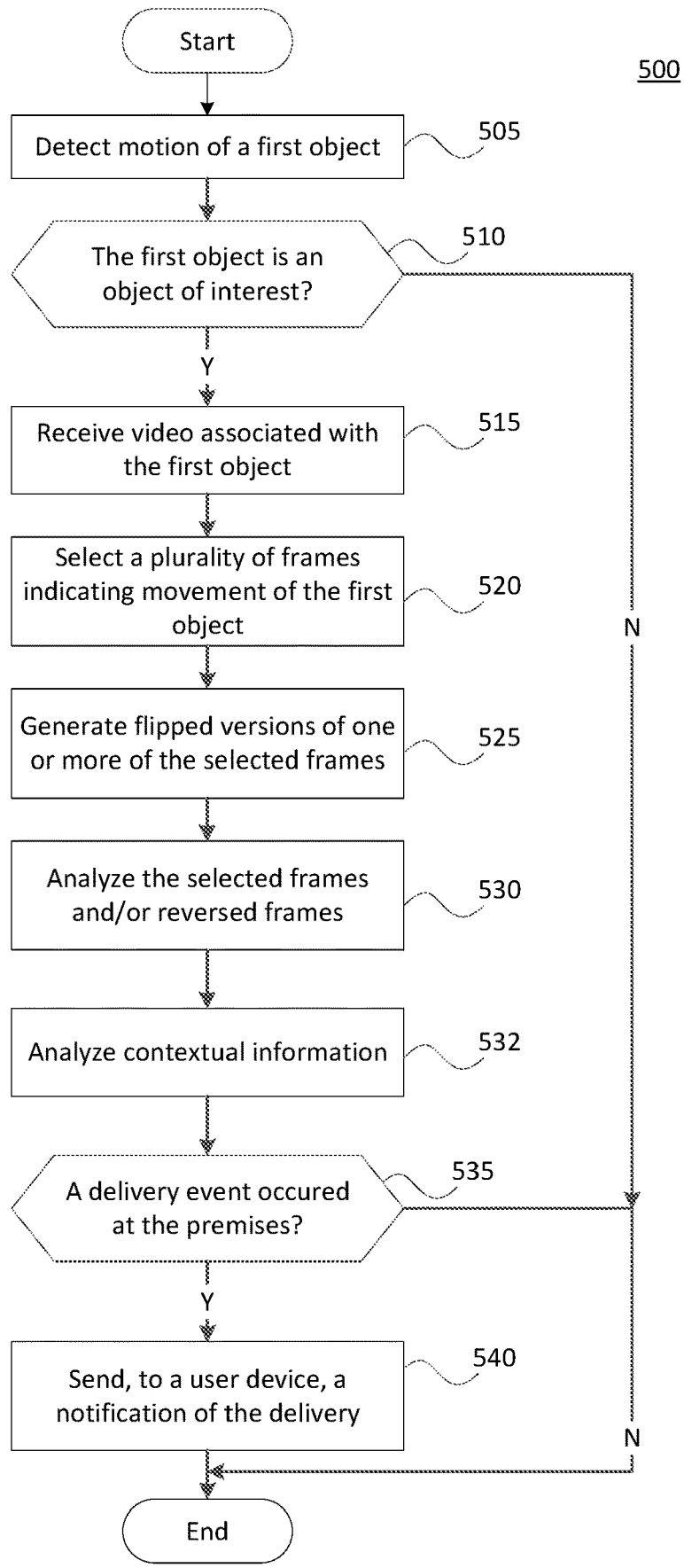
FIG. 5 is a flow chart showing steps of an example method associated with delivery detection.

FIG. 5 is a flow chart showing steps of an example method associated with detecting a delivery event. For convenience, FIG. 5 is described by way of an example in which the steps are performed by the camera 401. Also or alternatively, one, some, or all steps of the example method of FIG. 5, or portions thereof, may be performed by one or more other computing devices (e.g., the cloud server 310, video processing server 140, image recognition database 141, notification server 142, or any of the computing devices shown in FIGS. 1-3). One, some, or all steps of the example method of FIG. 5 may be performed in connection with delivery detection discussed in the example of FIGS. 4A-4C. One, some, or all steps of the example method of FIG. 5 may be omitted, performed in other orders, and/or otherwise modified, and/or one or more additional steps may be added.

In step 505, a motion may be detected in a field of view of the camera 401. The motion may be associated with a first object.

In step 510, the first object may be recognized as an object of interest. The object of interest may comprise an object that is likely to be associated with a delivery. For example, an object of interest may comprise a delivery person, a delivery robot, a delivery cart, a delivery truck, or any other object that is likely to be present while an item is delivered.

Recognizing the first object as an object of interest may be implemented by inputting videos or images associated with the detected motion into a first machine learning model, and receiving a prediction, from the first machine learning model, of whether the first object comprises an object of interest. For example, the first machine learning model may comprise a convolutional neural network. The first machine learning model may be trained to recognize an object of interest from a video or image. A plurality of training data sets (e.g., images or videos) may each identify an object of interest in a region of the respective training data set. The training data sets may be stored in a database (e.g., an image recognition database 141 as shown in FIG. 1, memory storage location in the camera 401, or any other database that communicatively connects with the camera 401) and used to train the first machine learning model to make the prediction.

The first machine learning model may recognize a moving blob or a group of moving blobs that are associated with the detected motion. The first machine learning model may crop out the moving blob(s) and apply image recognition technology to determine the type of object that the moving blob(s) is likely to represent. The object of interest may be recognized based on a variety of factors (e.g., size, shape, color, contour, movement patterns, or other features). For example, if the moving blob is too small, it may indicate the moving blob is a dog instead of a delivery person. In another example, if the moving blob does not change its location over time, it may indicate the moving blob is a tree instead of a delivery person.

The moving blob may comprise an object of interest and other objects or contexts. For example, if a delivery person is treated as an object of interest, the entire moving blob may comprise the delivery person and other objects that move together with the delivery person (e.g., one or more items being delivered or a delivery cart). Those other objects that move together with the identified object of interest may also be analyzed in the steps discussed below and provide helpful information to determine a delivery event.

If the first object comprises an object of interest, the method may proceed to step 515, in which the camera 401 may record a video that records the movement of the first object over a longer period of time. If the first object does not comprise an object of interest, the camera 401 may wait until another motion is detected.

In step 515, the camera 401 may record, based on the detected motion, video of a first object. The camera 401 may record the video and/or store the video separately (e.g., locally or at a cloud server 310) for further processing. A computing device may receive the recorded video for further processing. The computing device and the camera 401 may be located on the same physical device, or the computing device may be a physical device that is separate from the camera 401. As discussed in connection with FIGS. 4A-4C, the video may start when the motion of the first object was first detected (e.g., when the delivery person 410 walks into the field of view 405 of the camera 401), and may end after the first object disappears from the field of view 405 (e.g., after the delivery person 410 walks out of the field of view 405 after the delivery is completed). An identifier may be assigned to the recorded video.

The camera 401 may track the movement of the first object while recording the video. For example, the camera 401 may adjust the position of the camera 401 so that the first object remains in a central area of the field of view 405 while moving. Additionally or alternatively, the camera 401 may adjust the field of depth so that the first object remains in sharp focus while moving. This may be helpful for obtaining a video that better displays the first object and may therefore improve the accuracy of the delivery detection.

In step 520, a plurality of frames may be selected from the recorded video. The plurality of frames may indicate the movement of the first object (e.g., the delivery person) and/or other objects that move together with the first object. For example, one frame from the video may be selected at a certain time interval (e.g., one frame may be selected every second). In another example, frames may be selected based on whether they are likely to be representative of the movement of the first object, and/or other objects that move together with the first object. For example, the selected frames may comprise one or more frames in which the first object moves toward one direction (e.g., as shown in FIG. 4A), one or more frames in which the first object stops at a particular location (e.g., as shown in FIG. 4B), and/or one or more frames in which the first object moves toward another direction (e.g., as shown in FIG. 4C). More frames may be selected during a time period of the video associated with the movement of the first object that is more indicative of a potential delivery event. For example, compared with the number of frames selected in which the first object is moving constantly, more frames may be selected in which the first object stops in front of the door, as the behavior while the first object stops in front of the door may be more indicative of a potential delivery event (e.g., more indicative of whether the first object is placing the delivered item or doing something else).

As discussed below, the selected frames, or the object of interest cropped from the selected frames may be input into a second machine learning model to determine a likelihood of a delivery event. Processing selected frames, instead of the entire video, may be beneficial because it may require fewer computing resources for storage, transmission and/or processing. However, it is appreciated that the entire video or selected video clips, instead of video frames, may be used for further processing. Similar to selecting frames, video clips may also be selected at a certain time interval, based on whether the video clips are likely to be representative of the movement of the first object, or be selected in any other appropriate ways. For conciseness, the below steps discuss processing video frames only. But the below steps may also apply if video clips or the entire video is used.

In step 525, flipped versions (e.g., left-right flipped versions) of one or more of the selected frames may be generated. As discussed below, the flipped versions of the one or more selected frames may also be input into the second machine learning model to determine the likelihood of a delivery event. Using both an original frame and a flipped frame for image recognition may improve the accuracy of the recognition, because sometimes a machine learning model may be better at recognizing a flipped frame than an original frame due to the training data set. For example, if most people hold an item in their right hand, the machine learning model may obtain more training data associated with people holding an item with the right hand than training data associated with people holding an item with the left hand. If the camera 401 captures a video of a delivery person holding an item with his left hand, it may be easier for the machine learning model to recognize the flipped version of the frame.

In step 530, the selected frames, the flipped frames, and/or one or more additional frames may be analyzed to determine a likelihood of a delivery event. The determination may use a second machine learning model that is trained to determine whether input frames of a video indicate a high likelihood of a delivery event. The selected frames, the flipped frames, the one or more additional frames, or the object of interest cropped from the above-discussed frames may be input into the second machine learning model.

As discussed in connection with FIGS. 4A to 4C above, the likelihood of a delivery event may be based on the movement pattern of the first object and/or other objects that move together with the first object. For example, movement patterns that indicate a high likelihood of a delivery event may comprise typical behaviors of a delivery person and/or context that usually accompanies a delivery event. For example, if a first object moves, during a first time period, in a first direction (e.g., as shown in FIG. 4A), and moves, during a second time, in a second direction (e.g., as shown in FIG. 4C), a high likelihood of a delivery event may be determined if the first direction and the second direction are substantially opposite directions. That is because the opposite moving direction may indicate a delivery person brings an item from a delivery vehicle (e.g., a car or truck), leaves the item at the door of the premises, and then goes back to the delivery vehicle. Such movement pattern may distinguish from a neighbor who simply passes by. Additionally or alternatively, a high likelihood of a delivery event may be determined if the time period when the delivery person stops near the door is within a predetermined duration (e.g., within 2 minutes). This is because the time duration may indicate a delivery person spends some time placing the item instead of doing something else. For example, this may distinguish from a friend who visits the premises, where the time period may be significantly longer than 2 minutes.

Additionally or alternatively, if the first object moves, in the first direction and during a first time period, together with a second object, and moves, in the second direction and during a second time period, without the second object, a high likelihood of a delivery event may be determined. As discussed in connection with FIGS. 4A to 4C above, the presence of the second object during the first time period may be determined by comparing video frames that were captured during the first time period with video frames that were captured during the second time period.

In step 532, contextual information may be analyzed to further help with determining a delivery event. As may be discussed in connection with FIGS. 4A to 4C, contextual information may comprise the appearance of an object that typically accompanies a delivery event (e.g., logos on the delivered item, a delivery truck), sounds that typically accompany a delivery event (e.g., sounds of a large truck, knocking the door). A score may be assigned upon the detection of each piece of contextual information. A higher score may be assigned to the type of contextual information that has a stronger correlation with a delivery event. For example, the sound of the arrival of a large truck may be assigned to a score of 2, while a logo of a delivery company on the uniform of a delivery person may be assigned to a score of 5.

A second delivery event in the neighborhood may also be relevant contextual information, especially if the second delivery event occurs within a certain time period before or after the motion is detected near the premises. This is because a delivery person may be likely to deliver multiple items in a neighborhood consecutively. For example, a second delivery event may be detected at a second premises located within a geographical area proximate to the premises that is associated with the camera 401. A notification of the second delivery event may be sent to the camera 401 (e.g., via a cloud server 310 as shown in FIG. 3). The notification may include location information of the second premises and/or a timestamp associated with the second delivery event. The likelihood of a delivery event may be calculated at the premises based on the notification. The score may be assigned based on the distance between the second premises and the premises, and/or the time interval between the second delivery event and the motion detected in step 505.

In step 535, a determination may be made as to whether a delivery event occurred, based on the movement pattern and/or the contextual information discussed above. For example, an overall score may be calculated based on the movement pattern and/or contextual information. It may be determined that a delivery event occurred if the overall score exceeds a threshold. If it is determined that a delivery event occurred at the premises, the method may proceed to step 540. If it is determined that a delivery event did not occur at the premises, the camera 401 may wait to detect the next motion.

In step 540, a notification of the delivery event may be sent to a user device (e.g., user device 320 as shown in FIG. 3). The notification may be based on the determination that the pattern of movement and/or contextual information indicates the delivery of the second object. The notification may be sent via a server (e.g., a cloud server 310 as shown in FIG. 3). The notification may comprise information about the delivery event. For example, the notification may include an approximate time when the item is delivered, a location (e.g., front door, side door, garage) where the item is placed, estimated size of the item being delivered, an image representative of the delivery event, or any other information that may help the user to know about the delivery event.

Figure 6:
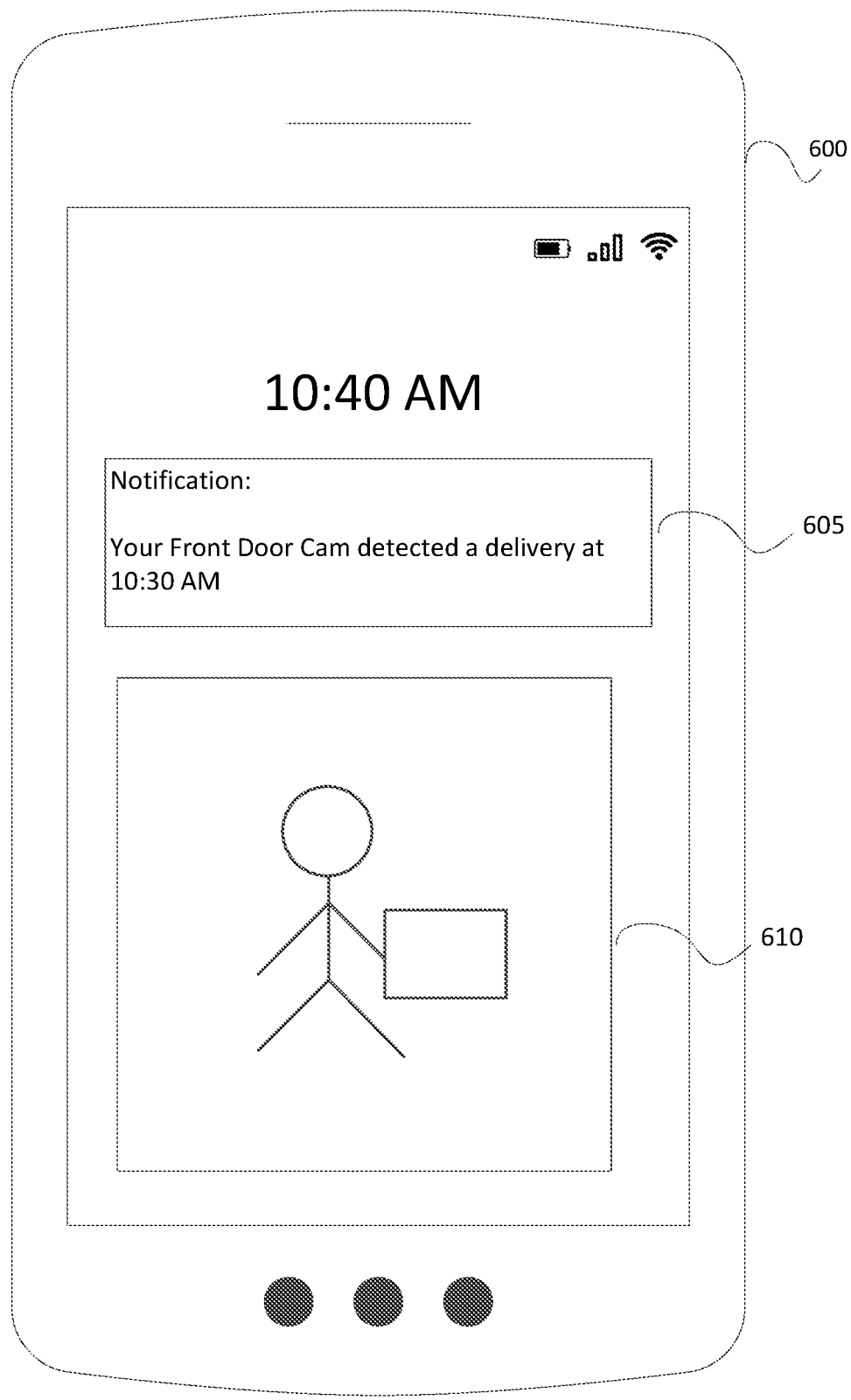
FIG. 6 shows an example user interface.

FIG. 6 shows an example user interface 600 that may be output via a user device, and that displays a notification of a detected delivery. As shown in FIG. 6, the user interface 600 of a user device displays a text notification 605 that states "Your Front Door Cam detected a delivery at 10:30 AM." An image 610 is displayed below the text notification 605. The image 610 may be an image that was captured while the delivery person moves in the field of view 405 of the camera 401. The image 610 may be selected to represent the delivery event. For example, if a delivered item is detected in the video, an image that includes the delivered item may be selected in order to provide the user information regarding the type of object being delivered.

It is appreciated that other information may also be included in the notification. For example, a user profile that lists a plurality of upcoming deliveries may be obtained. The notification may include a prediction in terms of which upcoming deliveries are associated with the detected delivery event. The prediction may be made based on an estimated arrival time of an upcoming delivery event indicated in the user profile, a comparison between an estimated size of the item captured in the video and the estimated size of each of the upcoming items indicated in the user profile, and/or other information. For example, each upcoming delivery event in the user profile may be assigned a priority value that indicates whether the item needs to be retrieved promptly. For example, a jewelry delivery may be assigned a high priority value, while a toy delivery may be assigned a normal priority value. The priority value of the detected delivery event may also be included in the notification.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device based on detected motion in a field of view of a camera associated with a premises, video of a first object;
determining, by the computing device and based on tracking a position of the first object in the video, a time period between the first object disappearing from the field of view and the first object reappearing in the field of view;
determining, by the computing device and based on the time period satisfying a threshold, that a delivery of a second object occurs at the premises; and
sending, by the computing device to a user device, a notification of the delivery.

2. The method of claim 1, wherein the second object is delivered at a location that is outside the field of view of the camera.

3. The method of claim 1, wherein the determining that the delivery of the second object occurs is further based on:
determining that the first object moves, during a first time period and together with the second object, in a first direction; and
determining that the first object moves, during a second time period and without the second object, in a second direction.

4. The method of claim 1, further comprising:
selecting, from the video of the first object, a frame and a region of the frame indicating the first object; and
generating a flipped version of the selected frame; and
wherein the determining the time period is based on the selected frame and the flipped version of the selected frame.

5. The method of claim 1, further comprising:
selecting, from the video of the first object, a plurality of frames comprising regions indicating movement of the first object; and
comparing the regions of the plurality of frames; and
wherein the determining the time period is based on the comparing.

6. The method of claim 1, further comprising:
causing, based on determining the first object as an object of interest, movement of the camera to track the movement of the first object.

7. The method of claim 1, further comprising:
receiving, from a second camera, second video that indicates delivery of a third object at a second premises located within a geographical area proximate to the premises; and
wherein the determining that the delivery of the second object occurs is further based on the second video.

8. The method of claim 1, further comprising:
determining contextual information associated with the first object; and
wherein the sending the notification is further based on the contextual information.

9. The method of claim 1, wherein the determining that the delivery of the second object occurs is futher based on:
determining that a pattern of movement of the first object indicates placement of the second object at or near the premises.

10. A method comprising:
selecting, by a computing device and from video recorded by a camera associated with a premises, a frame and a region of the frame indicating a first object;
generating, by the computing device, a flipped version of the selected frame;
determining, by the computing device based on tracking a position of the first object in the selected frame and the flipped version of the selected frame, that a pattern of movement of the first object; indicates a delivery, of a second object, occurs at the premises; and sending, by the computing device, to a user device, and based on the determination that the delivery occurs, a notification of the delivery.

11. The method of claim 10, wherein the second object is delivered at a location that is outside a field of view of the camera.

12. The method of claim 10, wherein the determining that the delivery occurs is further based on:
   determining that the first object moves, during a first time period and together with the second object, in a first direction; and
   determining that the first object moves, during a second time period and without the second object, in a second direction.

13. The method of claim 10, wherein the determining that the delivery occurs is further based on contextual information comprising at least one of:
   sounds accompanying appearance of the first object;
   appearance of a delivery vehicle;
   a logo associated with a delivery service; or
   second video, received from a second camera, that indicates delivery of a third object at a second premises located within a geographical area proximate to the premises.

14. The method of claim 10, wherein the determining that the delivery occurs is further based on a time period, between the first object disappearing from a field of view and the first object reappearing in the field of view, satisfying a threshold.

15. The method of claim 10, wherein the notification comprises a priority value, associated with the delivery, that is based on a user profile that lists a plurality of scheduled deliveries, and wherein at least two of the plurality of scheduled deliveries are assigned different priority values.

16. An apparatus comprising:
   one or more processors; and
   memory storing instructions, when executed by the one or more processors, configure the apparatus to:
      receive, based on detected motion in a field of view of a camera associated with a premises, video of a first object;
      determine, based on tracking a position of the first object in the video, a time period between the first object disappearing from the field of view and the first object reappearing in the field of view;
      determine, based on the time period satisfying a threshold, that a delivery of a second object occurs at the premises; and
      send, to a user device, a notification of the delivery.

17. The apparatus of claim 16, wherein the second object is delivered at a location that is outside the field of view of the camera.

18. The apparatus of claim 16, wherein the instructions, when executed by the one or more processors, configure the apparatus to determine that the delivery of the second object occurs by:
   determining that the first object moves, during a first time period and together with the second object, in a first direction; and
   determining that the first object moves, during a second time period and without the second object, in a second direction.

19. The apparatus of claim 16, wherein the instructions, when executed by the one or more processors, further configure the apparatus to:
   select, from the video of the first object, a frame and a region of the frame indicating the first object; and
   generate a flipped version of the selected frame; and
   wherein the instructions, when executed by the one or more processors, configure the apparatus to determine the time period further based on the selected frame and the flipped version of the selected frame.

20. The apparatus of claim 16, wherein the instructions, when executed by the one or more processors, further configure the apparatus to:
   select, from the video of the first object, a plurality of frames comprising regions indicating movement of the first object; and
   compare the regions of the plurality of frames; and
   wherein the instructions, when executed by the one or more processors, configure the apparatus to determine the time period further based on the comparing.

21. The apparatus of claim 16, wherein the instructions, when executed by the one or more processors, further configure the apparatus to:
   cause, based on determining the first object as an object of interest, movement of the camera to track the movement of the first object.

22. The apparatus of claim 16, wherein the instructions, when executed by the one or more processors, further configure the apparatus to:
   receive, from a second camera, second video that indicates delivery of a third object at a second premises located within a geographical area proximate to the premises; and
   wherein the instructions, when executed by the one or more processors, configure the apparatus to determine that the delivery of the second object occurs further based on the second video.

23. The apparatus of claim 16, wherein the instructions, when executed by the one or more processors, further configure the apparatus to determine contextual information associated with the first object; and
   wherein the instructions, when executed by the one or more processors, configure the apparatus to send the notification further based on the contextual information.

24. The apparatus of claim 16, wherein the instructions, when executed by the one or more processors, further configure the apparatus to determine that the delivery of the second object occurs by:
   determining that a pattern of movement of the first object indicates placement of the second object at or near the premises.

25. An apparatus comprising:
   one or more processors; and
   memory storing instructions, when executed by the one or more processors, configure the apparatus to:
      select, from video recorded by a camera associated with a premises, a frame and a region of the frame indicating a first object;
      generate a flipped version of the selected frame;
      determine, based on tracking a position of the first object in the selected frame and the flipped version of the selected frame, that a pattern of movement of the first object indicates a delivery, of a second object, occurs at the premises; and
      send, to a user device and based on the determination that the delivery occurs, a notification of the delivery.

26. The apparatus of claim 25, wherein the second object is delivered at a location that is outside a field of view of the camera.

27. The apparatus of claim 25, wherein the instructions, when executed by the one or more processors, configure the apparatus to determine that the delivery occurs by:
- determining that the first object moves, during a first time period and together with the second object, in a first direction; and
- determining that the first object moves, during a second time period and without the second object, in a second direction.

28. The apparatus of claim 25, wherein the instructions, when executed by the one or more processors, configure the apparatus to determine that the delivery occurs futher based on contextual information comprising at least one of:
- sounds accompanying appearance of the first object;
- appearance of a delivery vehicle;
- a logo associated with a delivery service; or
- second video, received from a second camera, that indicates delivery of a third object at a second premises located within a geographical area proximate to the premises.

29. The apparatus of claim 25, wherein the instructions, when executed by the one or more processors, configure the apparatus to determine that the delivery occurs further based on a time period, between the first object disappearing from a field of view and the first object reappearing in the field of view, satisfying a threshold.

30. The apparatus of claim 25, wherein the notification comprises a priority value, associated with the delivery, that is based on a user profile that lists a plurality of scheduled deliveries, and wherein at least two of the plurality of scheduled deliveries are assigned different priority values.

31. The method of claim 1, wherein the tracking the position of the first object in the video comprises:
- receiving, from a machine learning model, a prediction indicating that the first object comprises an object of interest, wherein the machine learning model is trained, by a plurality of training data sets each identifying a respective object of interest, to recognize an object of interest from an input video.

32. The method of claim 1, wherein the tracking the position of the first object in the video comprises:
- recognizing, using a machine learning model, a moving blob in the video;
- cropping, from one or more image frames of the video, one or more regions associated with the moving blob; and
- determining, by applying an image recognition algorithm, that the moving blob is associated with the first object.

* * * * *